United States Patent [19]
Häusler et al.

[11] Patent Number: 5,355,753
[45] Date of Patent: Oct. 18, 1994

[54] METHOD AND ARRANGEMENT FOR CUTTING COLD PILGERED TUBES

[75] Inventors: Karl-Heinz Häusler, Korschenbroich; Horst Stinertz, Willich; Werner Henze, Langenfeld, all of Fed. Rep. of Germany

[73] Assignee: Mannesmann Aktiengesellschaft, Dusseldorf, Fed. Rep. of Germany

[21] Appl. No.: 55,211

[22] Filed: Apr. 27, 1993

[30] Foreign Application Priority Data

Nov. 13, 1992 [DE] Fed. Rep. of Germany ....... 4238961

[51] Int. Cl.$^5$ .......................... B23D 45/20; B26D 1/60
[52] U.S. Cl. ........................................... 83/37; 83/54; 83/319
[58] Field of Search ................ 83/17, 37, 38, 54, 318, 83/319, 331

[56] References Cited

U.S. PATENT DOCUMENTS 4,727,783  3/1988  John, Jr. ................................. 83/94
5,065,653  11/1991  Werner ................................. 83/199

*Primary Examiner*—Hien H. Phan
*Attorney, Agent, or Firm*—Cohen, Pontani, Lieberman, Pavane

[57] ABSTRACT

A method and an arrangement for cutting cold pilgered tubes during rolling on a cold pilger rolling mill with reciprocating rolling stand and with intermittent advance and/or intermittent rotation of the tube in the area of one of the two dead centers of the rolling stand. The method includes imparting on the tube along a distance range thereof behind the rolling zone a constant rotation corresponding to the average speed of rotation of the tube such that the tube is temporarily elastically twisted. The distance range is selected in accordance with parameters determined by the material and dimensions of the tube. The tube is cut within the distance range during the constant rotation. The arrangement for carrying out the method includes a cutting unit with a cutting tool and a clamping sleeve which clamps the tube circumference and is constantly driven for rotation. The cutting unit is arranged at a distance from the rolling stand which facilitates elastic torsion of the tube.

2 Claims, 1 Drawing Sheet

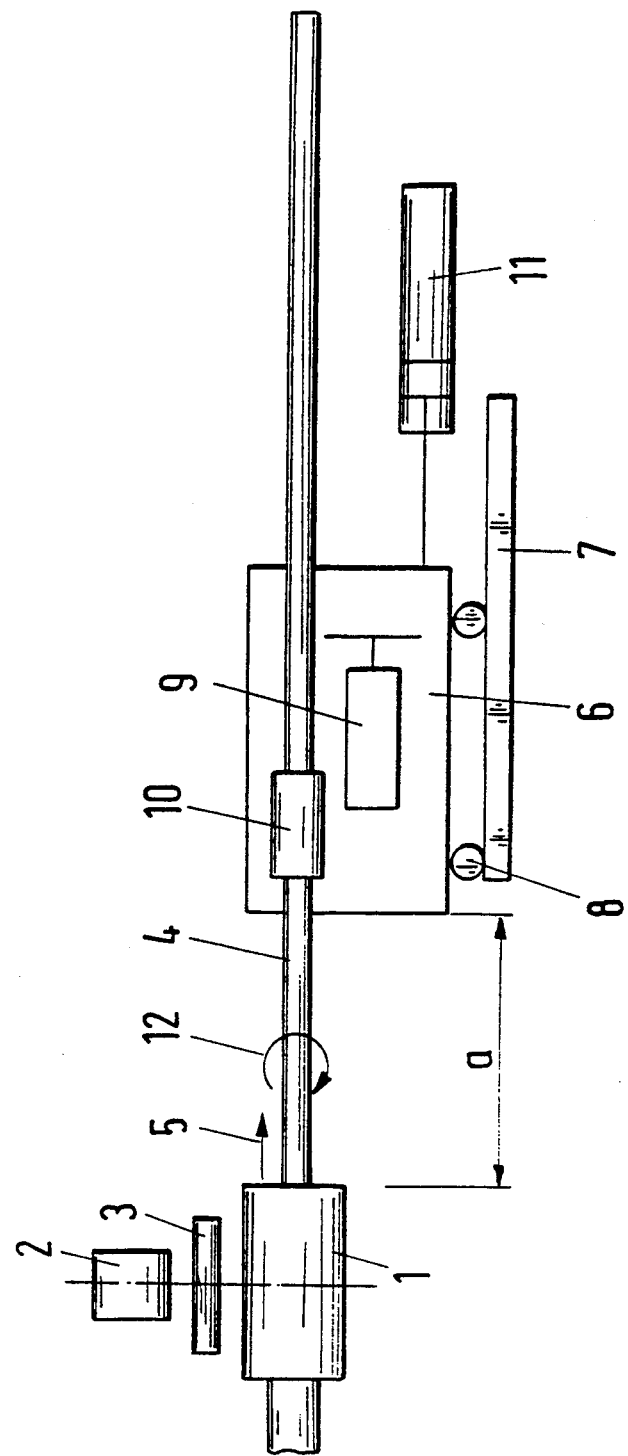

METHOD AND ARRANGEMENT FOR CUTTING COLD PILGERED TUBES

BACKGROUND OF THE INVENTION

1. Field of the Invention

The present invention relates to a separating method and arrangement for cutting cold pilgered tubes to length during rolling on a cold pilger rolling mill with a reciprocating rolling stand and intermittent advance and/or intermittent rotation of the tube in the region of one or both dead centers of the rolling stand.

2. Description of the Related Art

In contrast to tubes manufactured by means of other rolling methods, the cutting of tubes rolled in cold pilger rolling mills poses problems because, due to the typical pilger method, the tube is rolled with cyclically different speeds and, in addition, is turned or rotated intermittently. DE 31 05 780 A1 proposes the use of revolving knife cutting arrangements if it is the goal of the operator of a rolling mill to cut the pilgered tubes behind the cold pilger rolling mill in order to avoid large exit lengths, i.e., to avoid large machinery installations and factory space. However, these cutting arrangements have the disadvantage that the revolving knives produce burrs at the ends of the tubes which prevent the insertion of the plug during subsequent drawing of the tubes. This problem is solved by once again cutting off short end portions of the tubes which had been cut previously during the rolling procedure. The additional cuts are usually performed by means of cutting disks, saws or the like. This cutting procedure also produces a slight burr, however, this burr can be easily removed by brushing.

It would also theoretically be conceivable to use cutting disks or saws for cutting the tubes during the rolling procedure. However, cutting disks or saws cannot be used because the intermittent rotation of the tube temporarily and non-uniformly causes too much material to be supplied to the cutting tool, so that the cutting tools are overloaded and damaged or destroyed as a result.

SUMMARY OF THE INVENTION

Therefore, starting from the above-described disadvantages and problems of the prior art, it is a primary object of the present invention to provide a separating method and an arrangement for carrying out the method which make it possible to cut the cold pilgered tubes during rolling without requiring subsequent cutting of the tube ends.

In accordance with the present invention, a constant rotation is imparted on the tube corresponding to the average speed of rotation of the tube so that a portion of the tube is temporarily elastically twisted. The constant rotation is imparted on the tube over a distance range thereof behind the rolling zone of the rolling stand. The length of the distance range is determined by the material and the dimensions of the tube. The method further includes cutting the tube within the distance range outside the twisted portion during the constant rotation.

Accordingly, the gist of the present invention resides in that the tube is clamped or chucked during the cutting procedure and the tube is continuously rotated with an average rate of rotation in a forceable and jolt-free manner, so that during the cutting procedure always a uniform amount of material is to be cut. The method according to the present invention makes it possible to carry out the cutting procedure even while the tube is being rolled, without resulting in damage or destruction of the tools.

In the event that simultaneously with the rotation of the tube and during the cutting procedure an additional longitudinal advance of the tube takes place in the direction of the longitudinal axis of the tube, another feature of the present invention provides that cutting of the tube is carried out synchronously with the advancing movement of the tube in the direction of the longitudinal axis thereof. In other words, the cutting tool is moved in the same direction with the tube in accordance with the speed of the advance in longitudinal direction.

An arrangement for carrying out the method of cutting cold pilgered tubes to length includes a cutting unit which is arranged at the exit side of the cold pilger rolling stand at a distance which facilitates elastic torsion of the tube. The cutting unit is arranged so as to be movable along the direction of the tube axis and includes a clamping sleeve which surrounds and grips the tube circumference and is driven to rotate at a constant rate of rotation. The cutting unit further includes a chip-removing cutting tool. The tube which is intermittently rotated during the rolling procedure is gripped by the clamping sleeve of the arrangement according to the present invention, wherein the clamping sleeve is arranged at an appropriate distance from the rolling stand and is driven with a constant rate of rotation. The intermittent rotations of the tube are changed into a uniform and constant rotation, wherein the tube is rotated or twisted in the elastic range, i.e. without exceeding the yield point of the tube material. If the angle of rotation is small, this rotation is not harmful if, depending on the strength and yield point of the material to be cut, a sufficient distance is maintained from the deforming zone of the rolling stand. During the continuous rotation of the tube, the tube is cut by means of the cutting tool, such that uniform cutting speeds can be achieved.

In accordance with a further development of the present invention, the cutting unit is arranged on a carriage which is movable on a track. The carriage is driven in linear direction synchronously with the longitudinal advancing movement of the tube. Accordingly, the carriage travels with the advance of the tube in the longitudinal direction thereof and its linear drive is imparted by the clamping sleeve which grips the tube circumference. In other words, the carriage is clamped to the tube and participates synchronously with any advancing movement.

A linear drive in the form of a piston-cylinder unit is provided for returning the carriage.

The present invention makes it now possible in an advantageous manner to utilize chip-removing or machining cutting methods in which no burrs are formed or only small burrs are formed which can be easily removed.

The various features of novelty which characterize the invention are pointed out with particularity in the claims annexed to and forming a part of the disclosure. For a better understanding of the invention, its operating advantages, and specific objects attained by its use, reference should be had to the drawing and descriptive manner in which there are illustrated and described preferred embodiments of the invention.

BRIEF DESCRIPTION OF THE DRAWING

In the drawing:

The FIGURE of the drawing is a schematic view of the arrangement for cutting cold pilgered tubes in accordance with the present invention.

DESCRIPTION OF THE PREFERRED EMBODIMENT

The drawing schematically illustrates a cold pilger rolling mill 1 on which is imparted a reciprocating movement by a corresponding drive 2 through a gear unit 3. The tube 4 leaving the cold pilger rolling mill is intermittently advanced in the direction of arrow 5 and is simultaneously intermittently rotated in the direction of rotation 12.

The cutting unit according to the present invention is arranged at a distance a from the cold pilger rolling stand 1 on a carriage 6 which is movable on the track 7 by means denoted by reference numeral 8. The cutting unit includes a saw 9 and a clamping sleeve 10. A drive, not shown, rotates the clamping sleeve 10 at a constant rate of rotation. The clamping sleeve 10 grips the tube 4 at the circumference. The continuous rotary movement of the clamping sleeve 10 also continuously rotates the tube in this area, so that temporary elastic torsions of the tube 4 occur in the distance a because the tube 4 is intermittently rotated in the cold pilger rolling mill. These torsions are not harmful, but they make it possible to utilize a saw 9 for cutting the tube which operates at the same cutting speed, so that equal amounts of material are cut in equal time units.

In order to facilitate a synchronous movement of the saw 9 with the tube 4 during the advancing movement of the tube as indicated by arrow 5, the clamping sleeve 10 and the saw 9 are fixed in the common carriage in such a way that, when the clamping sleeve 10 is clamped to the tube 4, the carriage 6 is forced to participate in the advancing movement of the tube 4. The carriage rolls on the track 7 and the saw 9 can cut the tube during this period. Once the carriage 6 has reached its end position and the tube 4 has been cut, the return cylinder 11 is used for returning the carriage into its initial position for cutting the next length of tube.

It should be understood that the preferred embodiment and examples described are for illustrative purposes only and are not to be construed as limiting the scope of the present invention which is properly delineated only in the appended claims.

We claim:

1. A method of cutting cold pilgered tubes capable of bearing an elastic torsional load during rolling in a rolling zone of a cold pilger rolling mill with reciprocating rolling stand and with intermittent advancing movement and intermittent rotation of the tube at one of both dead centers of the rolling stand, the method comprising: imparting on the tube along a distance range thereof behind the rolling zone a constant rotation corresponding to an average speed of rotation of the tube such that the tube is temporarily elastically twisted along a portion of the distance range near the rolling zone, wherein the distance range is selected in accordance with parameters determined by the material and dimensions of the tube so that the twisting does not exceed the yield point of the tube material; cutting the tube within the distance range outside the twisted portion during the constant rotation synchronously with the advancing movement of the tube in the direction of the longitudinal axis thereof.

2. An arrangement for cutting cold pilgered tubes capable of bearing an elastic torsional load, the arrangement comprising a cutting unit arranged on an exit side of a cold pilger rolling stand so as to be movable in axial direction of the tube, the cutting unit being arranged at a distance from the cold pilger rolling stand facilitating elastic torsion of a portion of the tube, the cutting unit including a cutting tool and a clamping sleeve for clampingly surrounding the tube circumference and drive means for constantly rotating the clamping sleeve and the tube so that a portion of the tube between the sleeve and the rolling stand is temporarily elastically twisted, the arrangement further comprising a carriage movable in axial direction of the tube on a track, the cutting unit being mounted on the carriage, and linear drive means for synchronously moving the carriage with the advancing movement of the tube.

* * * * *